(12) United States Patent
Schwarz et al.

(10) Patent No.: US 6,435,625 B1
(45) Date of Patent: Aug. 20, 2002

(54) METHOD FOR APPLYING DEFINED OPERATING FORCES

(75) Inventors: Ralf Schwarz, Darmstadt; Rolf Isermann, Seeheim, both of (DE)

(73) Assignee: Continental Teves AG & Co., OHG, Frankfurt (DE)

(*) Notice: Subject to any disclaimer, the term of this patent is extended or adjusted under 35 U.S.C. 154(b) by 0 days.

(21) Appl. No.: 09/509,727

(22) PCT Filed: Sep. 29, 1998

(86) PCT No.: PCT/EP98/06190
§ 371 (c)(1),
(2), (4) Date: Aug. 23, 2000

(87) PCT Pub. No.: WO99/16650
PCT Pub. Date: Apr. 8, 1999

(30) Foreign Application Priority Data

Sep. 29, 1997 (DE) .............................. 197 42 920

(51) Int. Cl.⁷ .............................................. B60T 13/66
(52) U.S. Cl. ........................................................... 303/20
(58) Field of Search ........................... 303/3, 15, 20, 303/190, 191; 701/70, 71, 1.11 E; 188/72.1, 156, 158

(56) References Cited

U.S. PATENT DOCUMENTS

| | | | |
|---|---|---|---|
| 5,366,280 A | * 11/1994 | Littlejohn | 303/3 |
| 5,496,097 A | 3/1996 | Eckert | |
| 5,957,246 A | * 9/1999 | Suzuki | 188/72.1 |
| 6,015,194 A | * 1/2000 | Decker | 303/155 |
| 6,036,285 A | * 3/2000 | Murphy | 303/112 |
| 6,059,379 A | * 5/2000 | Deml et al. | 303/15 |
| 6,178,369 B1 | * 1/2001 | Bohm | 701/70 |
| 6,209,689 B1 | * 4/2001 | Bohm | 188/156 |

FOREIGN PATENT DOCUMENTS

| | | |
|---|---|---|
| DE | 195 37 348 | 4/1996 |
| DE | 296 22 787 | 6/1997 |
| DE | 196 21 671 | 12/1997 |
| EP | 0 233 360 | 9/1987 |

* cited by examiner

Primary Examiner—Christopher P. Schwartz
(74) Attorney, Agent, or Firm—Rader, Fishman & Grauer PLLC (57) ABSTRACT

The invention relates to a process and control circuits for generating defined actuating forces for a brake that is actuated electrically by means of an actuator or electric motor, wherein a first relationship exists between the actuator position and the torque generated by the actuator when the brake is applied and a second relationship exists between the actuator position and the torque generated by the actuator when the brake is released, defining such relationships make it possible to determine the actuating forces occurring during operation without any additional sensors. For this purpose, the present invention proposes that the actuator torques resulting from the first and second relationships be evaluated for determining the efficiency.

21 Claims, 10 Drawing Sheets

METHOD FOR APPLYING DEFINED OPERATING FORCES

TECHNICAL FIELD

The present invention generally relates to vehicle braking and more particularly relates to a process for generating defined actuating forces with respect to a brake that can be actuated electrically by means of an actuator and a gear, wherein a first relationship exists between the actuator position and the actuator torque when the brakes are applied and a second relationship exists between the actuator position and the actuator torque when the brakes are released, as well as control systems for executing the process.

BACKGROUND OF THE INVENTION

This type of process, for example, is known from the German utility model DE 296 22 787 U1. When the previously known process is executed, a characteristic curve which represents the relationship between the introduced motor current to be supplied to the actuator and the actuating force that can be expected from this motor current is scanned by an electronic control device in such a way that the appropriate current value is allocated to the desired actuating force. Wheel sensors are used for determining the actual braking force value, wherein the characteristic curve can be changed so that the saved relationship between motor current and actuating force can be adapted to the actual relationship.

A particularly less advantageous aspect is that the signals of the wheel sensors which need to be used to execute the known process can be disturbed by drift and offset. For this reason, the previously known process is not reliable and its execution is difficult.

Thus, it is the object of the present invention to propose processes and control systems that will increase the functional reliability when executing the process and provide additional possibilities of generating defined actuating forces. In particular it should, however, be possible to execute the processes without using any sensors, since they are expensive and susceptible to faults.

This object is solved by the process under discussion in that the actuator torques resulting from the first as well as second relationships are evaluated in order to determine the efficiency.

So as to render the concept of the invention more concrete, the actuator torques are evaluated at the same actuator positions, preferably for determining an actuator torque value which should be applied at this actuator position when the efficiency $\eta=1$.

In an advantageous further embodiment of the object of the invention the actuator torque is determined on the basis of the actuator current or the actuator current and the actuator voltage or the actuator current and the actuator position or the actuator voltage and the actuator position or the actuator current, the actuator voltage and the actuator position.

In addition, it is particularly advantageous when an estimate of the actuating force is determined on the basis of the actuator torque by means of the gear ratio.

According to another advantageous characteristic of the invention, the area for an actuator position region, which is limited by the two relationships, is evaluated to increase the quality of the process. For this purpose the evaluation is carried out in such a way that a) the actuator torque value is calculated by working out the mean of the maximum and minimum actuator torque;

b) the actuator torque value is defined by calculating the ordinates of the horizontal straight line that cuts the area in half;

c) the mean of the actuator torques of the two relationships is worked out at the same actuator position and that a compensating straight line is established by means of the ensuing mean values, whose ordinates are used as an estimate for the actuator torque value;

d) the center of gravity of the area is calculated and its ordinates are used as an estimate of the actuator torque value.

An improvement of the targeted control is obtained through another advantageous characteristic of the invention, wherein the actuator torques are adjusted by the torques of inertia of the brake prior to determining the efficiency.

Moreover, it is particularly sensible if the brake—while it is being applied—is additionally driven in such a way that an actuator torque-actuator position area is passed through, e.g. by superimposing a sinusoidal or cosine-shaped control signal over the actuating signal of the brake.

A first control circuit according to the present invention for executing the above-mentioned process is characterized in that a) a position control device is provided, to which the control difference between the signals representing the desired actuator position and the actual actuator position respectively is supplied as the input signal and whose output signal is used to drive the actuator via an electronic energy unit;

b) a brake model adaptation module is provided, to which the actuator torque value corresponding to efficiency $\eta=1$, the signals representing the appropriate actuator torques from one or both relationships and/or the signals representing the appropriate actuator position are supplied for adaptation and which generates model variables for a brake model;

c) a desired position value generator is connected upstream of the position control device, which contains the brake model and to which a signal corresponding to the desired actuating force as well as the adapted model variables are supplied and which generates the desired actuator position signal from the brake model;

d) an estimating module is provided, to which the signals corresponding to the actuator torque and/or the actuator position are supplied and which generates the actuator torque value corresponding to efficiency $\eta=1$, the signals representing the appropriate actuator torques from one or both relationships and/or the appropriate actuator position.

A second control circuit according to the present invention for executing the above-described process is preferably characterized in that a) a torque control device is provided, to which the control difference between a signal representing the desired actuator torque and a signal representing the actual actuator torque is supplied as the input signal and whose output signal is used to drive the actuator via an electronic energy unit;

b) a brake model adaptation module is provided, to which the actuator torque value corresponding to efficiency $\eta=1$, the signals representing the appropriate actuator torques from one or both relationships and/or the signals representing the appropriate actuator position are supplied for adaptation and which generates model variables for a brake model;

c) a desired torque value generator is connected upstream of the torque control device, which contains the brake model and to which a signal corresponding to the desired actuating force as well as the adapted model variables are supplied and which generates the desired actuator torque signal from the brake model;

d) an estimating module is provided, to which the signals corresponding to the actuator torque and/or the actuator position are supplied and which generates the actuator torque corresponding to efficiency $\eta=1$, the signals representing the appropriate actuator torques from one or both relationships and/or the appropriate actuator position.

In a third control circuit according to the present invention for executing the above-described process, the following components are provided:

a) an actuating force control device, to which the control difference between a signal representing the desired actuating force value and a signal representing the reconstructed actual actuating force value is supplied as the input signal and whose output signal is used to drive the actuator via an electronic energy unit;

b) a brake model adaptation module, to which the actuator torque value corresponding to efficiency $\eta=1$, the signals representing the appropriate actuator torques from one or both relationships and/or the signals representing the appropriate actuator position are supplied for adaptation and which generates model variables for a brake model;

c) an actuating force reconstruction module that is connected upstream of the actuating force control device and to which the signals representing the actual actuator torque and/or the actual actuator position are supplied and which generates the actual actuating force value from the brake model;

d) an estimating module, to which the signals corresponding to the actuator torque and/or the actuator position are supplied and which generates the actuator torque corresponding to efficiency $\eta=1$, the signals representing the appropriate actuator torques from one or both relationships and/or the appropriate actuator position.

In this connection it is particularly advantageous if the brake model adaptation module calculates the brake model variables by means of parameter estimates.

It is planned to have the brake model display the rigidity or efficiency of the brake in other advantageous embodiments of the object of the present invention.

A fourth control circuit according to the present invention for executing the above-described process exhibits the following circuit components:

a) a braking torque control device is provided, to which the control difference between a signal representing the desired braking torque value and a signal representing the reconstructed actual braking torque value is supplied as the input signal and whose output signal is used to drive the actuator via an electronic energy unit;

b) a characteristic curve adaptation module is provided, to which the estimated actuating force value and the signal corresponding to the wheel slip are supplied for adaptation and which generates parameters (characteristic values) for a relationship (characteristic curve) between the wheel slip and the braking torque;

c) a braking torque reconstruction module is connected upstream of the braking torque control device, which contains the relationship and to which a signal corresponding to the wheel slip as well as the adapted parameters (characteristic values) are supplied and which generates the actual braking torque value;

d) an estimating module is provided, to which the signals corresponding to the actuator torque and actuator position are supplied and which generates the estimated actuating force value.

A fifth control circuit according to the present invention to execute the above-described process is characterized in that a) a slip control is provided, to which the control difference between a signal representing the desired wheel slip value and a signal representing the actual wheel slip value is supplied as the input value and whose output signal is used to drive the actuator via an electronic energy unit;

b) the estimated actuating force value and the signal corresponding to the wheel slip are supplied to a characteristic curve adaptation module for adaptation, which generates parameters (characteristic values) for a relationship (characteristic curve) between the wheel slip and the braking torque, wherein c) a desired wheel slip value generator is connected upstream of the slip control, which contains the relationship and to which a signal corresponding to the desired braking torque as well as the adapted parameters (characteristic values) are supplied and which generates the desired wheel slip signal;

d) an estimating module, to which the signals corresponding to the actuator torque and the actuator position are supplied and which generates the estimated actuating force value.

In this connection it is particularly advantageous if the characteristic curve adaptation module adapts the characteristic curve by estimating the parameters.

Finally, the following circuit components are provided in a sixth control circuit according to the present invention for executing the above-described process:

a) an actuating force control device, to which the control difference between a signal representing the desired actuating force value and a signal representing the actual actuating force value is supplied as the input signal and whose output signal is used to drive the actuator via an electronic energy unit;

b) an actuating force sensor, whose output signal is the actual actuating force value; and c) a monitoring module for the actuating force sensor, which monitors the actuating force sensor by means of the estimated actuating force value.

DETAILED DESCRIPTION OF THE PREFERRED EMBODIMENTS

Figure 1:
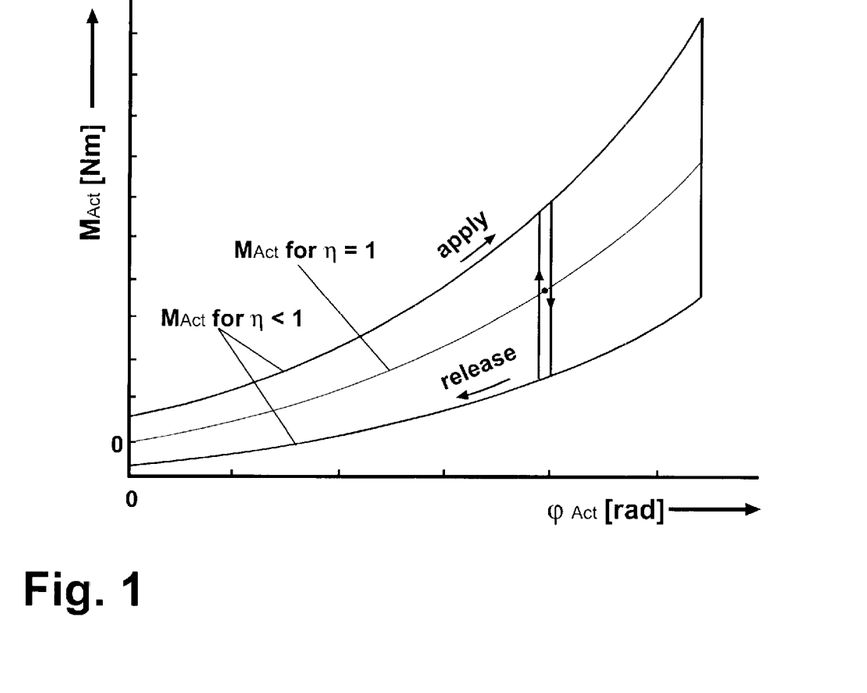
FIG. 1 A diagram showing the dependency of the actuator torque on the actuator position or how the process according to the present invention works.

Regarding FIG. 1, it is assumed that the above-mentioned actuator is formed by an electric motor. In an electric motor the actuator torque can be calculated on the basis of either one or several of the following variables: motor current $I_{Act}$, motor voltage $U_{Act}$, and motor positions $\phi_{Act}$. The motor position $\phi_{Act}$ must be measurable (possible in many types of motors due to their design, e.g. electronically commutated synchronous motor, switched reluctance motor ) or it must be possible to reconstruct it from the motor current $I_{Act}$ and the motor voltage $U_{Act}$.

FIG. 1 shows the fundamental curve of the actuator torque $M_{Act}$ in relation to the actuator position $\phi_{Act}$. For efficiency $\eta=1$ the actuator torque values during almost static application (acceleration $\omega_{Act}$ is so low that inertia torques J and mass m can be disregarded) as well as during release lie on the same curve. If inertia torques that cannot be disregarded arise for an efficiency $\eta=1$, an appropriate static torque $M_{Act,stat}$ can be determined from the measured actuator torque $M_{Act,dyn}$ by means of the inertia and the acceleration ($\dot{\omega}_{Act}$), $$M_{Act,stat,\eta=1} = M_{Act,dyn,\eta=1} - \dot{\omega}_{Act} J - m \dot{\omega}_{Act} v^2$$

with v being a factor that takes into consideration the gear ratio of the gear located between the actuator and the brake.

The desired actuating force $F_{ActF}$, in the case of $\eta=1$, can be calculated directly from the static actuator torque:

$$F_{ActF} = \frac{M_{Act,stat}}{v}$$

If $\eta=1$ the static actuator torque during application lies above the characteristic curve for $\eta=1$ and during release it lies below this characteristic curve. The resulting area is disproportional to the efficiency of the brake, i.e. the greater the described area, the smaller the efficiency of the brake.

For $\eta<1$, the dynamic actuator torque can be expressed as follows:

$$M_{Act,stat,\eta=1} = M_{Act,dyn,\eta<1} - (J+mv^2)$$
$$\dot{\omega}_{Act} - d_{ges}\omega_{Act} - \mathrm{sign}(\omega_{Act}) \cdot (M_{c0} + \gamma \cdot F_B)$$

with $\omega_{Act}$ standing for the actuator speed, $d_{ges}$ standing for the viscous friction, $M_{c0}$, standing for the "dry" friction and $\gamma$ standing for a proportionality factor so that the influence of the actuating force on the dry friction is taken into consideration.

For $\eta<1$ the actuator torque value $M_{Act,stat,\eta<1}$ cannot be calculated directly due to the unknown friction parameters. However, one can make use of a special characteristic of electric brakes. Due to their design, only the sign of the "dry" friction parts changes when the direction of rotation is reversed, i.e. between the states "application" and "release". The absolute value of the dry friction—due to the construction of the friction parts (bearings, e.g. ball bearings, spherical roller bearings etc., and spindle drives, e.g. roller threaded drives)—is independent of the direction of rotation. However, this characteristic is true only under the assumption that the same application force is applied as a counter force at the same position; this, however, is correct when the same positions are passed through at very short intervals since the rigidity characteristic curve (relationship between actuating force and actuator position) changes only very slowly.

Consequently, if one determines the two torques $M_{Act,\eta<1,apply}$ and $M_{Act,\eta<1,release}$ at the same actuator position $\omega_{Act}$ but for different directions of rotation, then the amount of the dry friction part is the same for both directions of rotation (applying and releasing). Therefore, the dry friction ($M_{C0}+\gamma F_{ActF}$) can be eliminated by adding the two torques $M_{Act,\eta<1,apply}$ and $M_{Act,\eta<1,release}$ at the same actuator position $\omega_{Act}$.

Thus, the desired actuator torque value $M_{Act,stat,\eta=1}$ ($\eta=1$) can be calculated as follows with the two torques $M_{Act,dyn,\eta<1,apply}$ and $M_{Act,dyn,\eta<1,release}$ at the same actuator position:

$$M_{Act,stat,\eta=1} = \frac{1}{2} \cdot [(M_{Act,dyn,\eta<1,apply} + M_{Act,dyn,\eta<1,release}) -$$
$$(J + mv^2) \cdot (\dot{\omega}_{Act,apply} + \dot{\omega}_{Act,release}) -$$
$$d_{ges} \cdot (\omega_{Act,apply} + \omega_{Act,release})]$$

Nonetheless, this equation still contains the unknown, time variant parameter $d_{ges}$ (viscous friction). Two modes of proceeding are possible for solving this problem:

$d_{ges}$ can be estimated by means of identification processes. For this purpose, it would be necessary to dynamically excite the brake when it is in a ventilated state ($F_{ActF}=0$, i.e. during phases when the brake is not being applied by the driver or the higher-level control system) and to determine $d_{ges}$ by means of a parameter estimate.

It is, however, more advantageous to ensure that the points of the same position or the same actuating force when applying and releasing are passed through at the same rate of speed. Then the term by which $d_{ges}$ is multiplied becomes zero and the influence of the viscous friction also is compensated by itself. One can achieve this, for example, by superimposing a sinus with small amplitude (not tangible by the driver) over the desired actuator position signal or the desired actuating force signal, thereby passing through "hysteresis cycles" (see FIG. 1). The speed $\omega_{Act}$ then has a cosine form, so that the same speed is set at the same actuator position.

Hence, the advantage of the latter process combined with an excitation that causes the same positions to be passed through at the same speeds is that the three unknown friction parameters, i.e. viscous friction $d_{ges}$, Coulomb friction $M_{C0}$ and the friction factor taking into consideration the load $\gamma$ do not have to be known. They are compensated by themselves during the calculation. Thus, the following simplified relationship results:

$$M_{Act,stat,\eta=1} = \frac{1}{2} \cdot [(M_{Act,dyn,\eta<1,apply} + M_{Act,dyn,\eta<1,release}) - (J+mv^2) \cdot (\dot{\omega}_{Act,apply} + \dot{\omega}_{Act,release})]$$

Given appropriate excitation, only the inertia moments and masses need to be calculated from the actuator torques.

By determining the torque required for applying or releasing the brake with respect to an actuator position or actuating force respectively, the efficiency or the actuating force can be calculated.

In this respect, the design of the measuring process or the excitation determines to what extent subsequent corrective calculations or additional identification processes may become necessary.

The practical implementation of the described principle calls for a reversal of motion in the brake. Thus, regions have to be evaluated, in which a reversal of motion is present due to the specified actuating force or in which this reversal of motion was excited artificially. In the latter case a corresponding position signal or force signal is specified. Since this excitation signal specifies only small changes around an operating point and it only makes sense to evaluate a reversal of motion in a small region, it can be assumed that the relationship between force and position in this region is linear. Hence, there is no difference in the shapes of the force or position signal curves, and the differentiation is not relevant for the following fundamental observations. When selecting the signal in connection with artificial excitation, one must take into account that the estimate of the actuating force should be carried out during normal operation of the brake. Consequently, one should strive for a situation, in which, despite the necessary reversal of motion between applying and releasing, at least the mean of the actuating force corresponds to the driver's wishes and that the fluctuations remain negligibly small. A sinusoidal oscillation is suitable with respect to the position or force signal which is to give rise to a reversal of motion in the brake. Thus, it suggests itself that a sinus should be superimposed over the desired braking force value specified by the driver or a higher-level control system. In this manner of proceeding the mean value of the braking force always follows the driver's wishes. When the process is applied to regions in which the reversal of motion is caused by the specified actuating force, corrective calculations will have to be carried out, since the points of the same actuating force generally are passed through at different speeds and changing acceleration.

Figure 2:
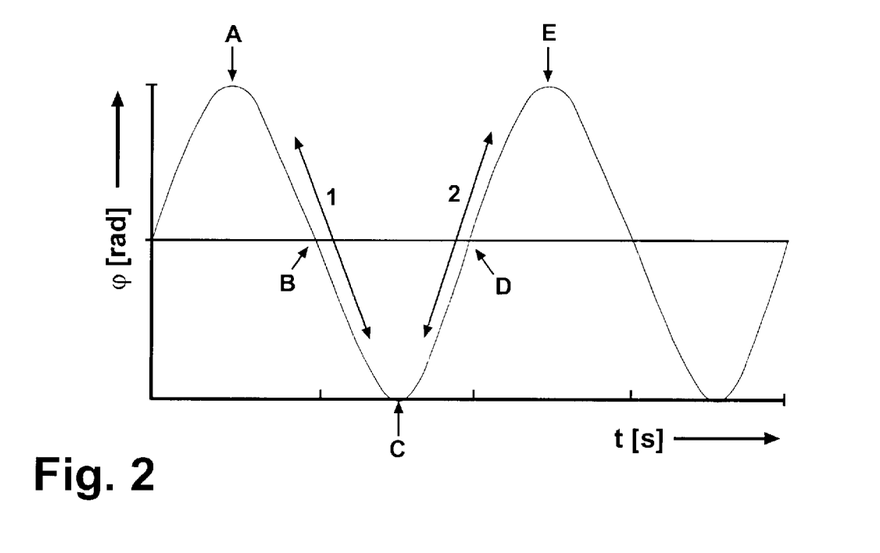
FIG. 2 A diagram of the time characteristic of the actuator position by superimposing a sinusoidal signal over the actuating signal by way of example.

When the position or force signal, as shown in FIG. 2, is a sinusoidal oscillation around a constant mean value, the conditions regarding the speed, under which no friction correction is necessary, are satisfied. Hence, it is appropriate to save the current wishes of the driver at certain intervals and to superimpose an oscillation over this value for the duration of the measurement. In order to comply with the request for as minimal intervention in the braking properties as possible, the duration of the measurement should be as short as possible. Nonetheless, it must come to at least one period of oscillation, which in turn limits the usable frequency. In addition, it must be ensured that the process is started only when the driver's wishes are practically constant and that the process is stopped when the desired value specified by the driver changes substantially, so that the actual braking force follows the desired value again. With the method proposed the efficiency or the actuating force of electric brakes can be estimated. The estimate is not available continuously, however.

In connection with the explanation of the method proposed, all dynamic influences will be disregarded at first. It is most expedient to present the shape of the curve that is to be expected, designated "I" in FIG. 3, in a coordinate system where the actuator position is presented as an abscissa and the torque of the actuator is shown as ordinates, wherein the individual segments are allocated to the appropriate phases of the oscillation (FIG. 2) by means of letters and numerals. These diagrams are discussed below, taking the first maximum of the sinus as the starting point.

Point A (FIG. 2) is the oscillation maximum and, consequently, also a point of reversal of the motion. In the torque-position diagram in FIG. 3 it is shown in a region because—due to the reversal of the direction of motion—the friction torque also changes its sign and, hence, there is a step change in the actuator torque. The actuator torque needed to maintain the position is reduced since from this point onwards the friction slows down the return travel of the brake and, thus, helps to maintain the position or the actuating force.

Figure 3:
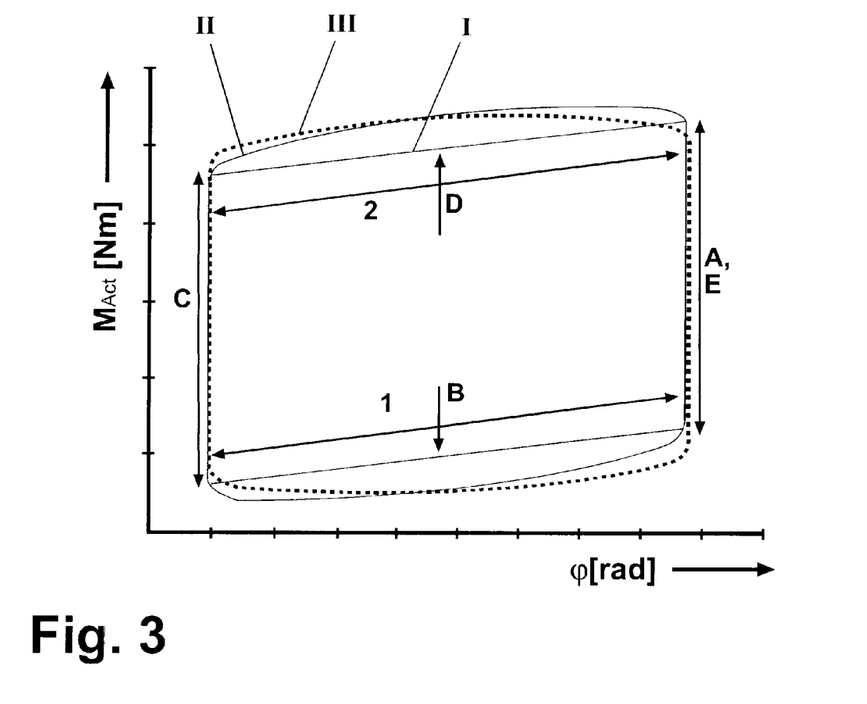
FIGS. 3 to 8 Diagrams of various methods for determining the fictive actuator torque corresponding to efficiency $\eta=1$.

Falling slope 1 also is shown in a region. The actuator torque drops with the position because the counter-torque, resulting from the application force, sinks (spring characteristic).

At point C, the minimum, another reversal of motion occurs. This causes the required torque to be increased because now—in addition to the torque resulting from the application force— the friction has to be overcome, too. Hence, this point also is shown in a region in the torque-position diagram.

Rising slope 2 (designated with 2 in FIG. 2) is shown in a region. Proportional to the increase of the position, the required torque also increases, since the application force increases with the distance traveled and it can be assumed that this relationship is linear with respect to the small changes observed around a working point.

Point E in FIG. 2 again corresponds to point A. And the cycle starts anew.

When the effects caused by the viscous friction are taken into consideration, other torque-position diagrams can be drawn up, which are marked as "II" and "III" in FIG. 3. In these diagrams, diagram "II" takes into consideration the viscous friction and does not take into consideration the inertia whereas diagram "III" takes into consideration both the viscous friction and the inertia. The regions 1 and 2 of these diagrams are different from those in diagram "I" discussed above.

Region I is curved downwards slightly because the viscous friction slows down the backwards motion of the gear, in other words less actuator torque is needed to maintain the specified actuating force. The extremum of the curvature is at point B because that is where the speed reaches its maximum.

Region II is curved upwards because the sign of the speed is positive here, i.e. the viscous friction as well as the counter-torque resulting from the actuating force have to be overcome by the actuator. Here the extremum of the curvature is at point D because this is where we find the maximum point of the speed for this segment of motion.

Up until now the influence of the torque that has to be generated to accelerate the mass has been disregarded. This effect will now be included in the considerations.

Since the position signal is sinusoidal, the second derivation is also a sinus. Consequently, the amount of the acceleration is proportional to the deviation from the middle position.

The sign becomes evident when one considers that the speed rises from zero to its maximum in the first half (segment between C and D) of region 2. Consequently, additional torque is needed to accelerate the masses: The curve of the torque lies above the curve that would result if the inertia were not taken into consideration. In the second half of region 2 the speed decreases. Thus the energy stored in the masses relieves the drive and the torque drops below the curve that would be passed through if the inertia were not taken into consideration.

The behavior in region 1 is analogous to that described above. Here the actuator torque in the first half (segment between A and B) is reduced due to the inertia since the slowing down continues. Additional torque is needed in the second half, since the acceleration sets in.

In summary it can be stated that the influences of the acceleration of the inertia cause the rise in regions 1 and 2, which result from the increase in the actuating force, to be reduced. Since the amount of the acceleration is a quadratic function of the frequency, the influence of the forces of inertia may prevail at high frequencies, so that a negative rise occurs.

Methods for Evaluating the Results

In the end an estimate of the efficiency or the actuating force is to be obtained from the output signals, whose fundamental curve was explained above for a sinusoidal superimposition. The different possibilities are discussed below. In connection with the following considerations it is assumed that the above-mentioned prerequisites are satisfied through the shape of the selected input signal.

Figure 4:
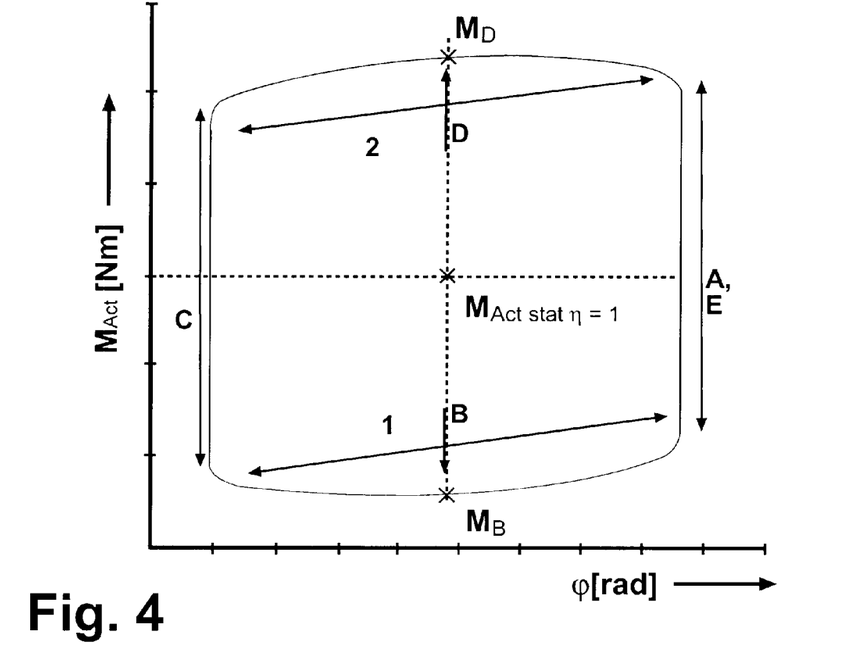

Since the estimate of the application force is to be allocated to the mean position value of the oscillation, FIG. 4 shows that the actuator torques at points B and D be used to calculate $M_{Act,stat,\eta=1}$ (it should be borne in mind that the values for $M_B$ and $M_D$ already are corrected by the influence of inertia). For practical applications, however, this approach obviously is not suitable since the estimate would be based on two isolated measured values and, consequently, would be highly susceptible to interferences. Thus, different methods of evaluation will be proposed.

What all methods have in common is that they use only one period of oscillation, i.e. exactly one cycle through the loop, as shown in FIG. 4.

Figure 5:
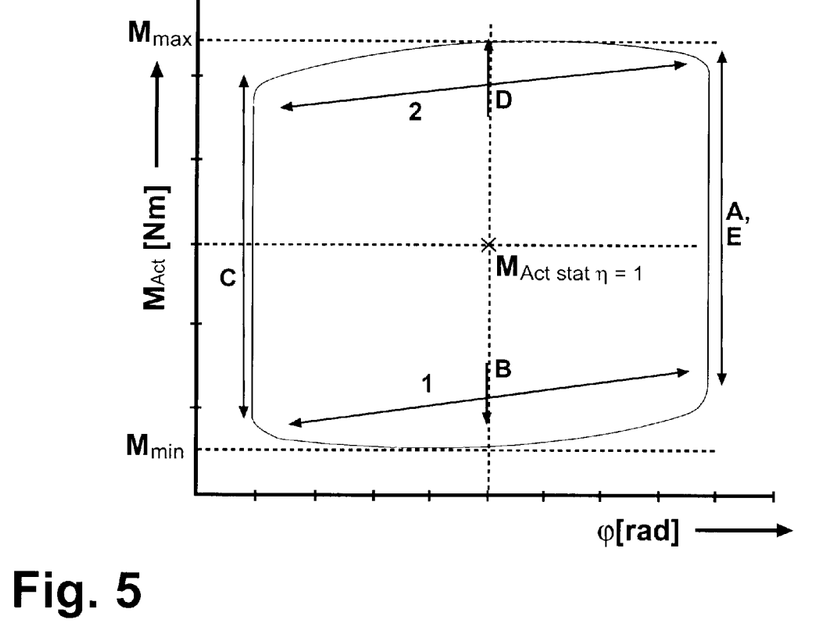

The method presented in FIG. 5 is very simple, since the estimate is based on just two measured values.

According to $$M_{Act,stat,\eta=1,estimate} = \frac{\min(M_{Act,dyn,\eta<1}) + \max(M_{Act,dyn,\eta<1})}{2}$$

the mean value of the minimum and maximum of the actuator torque is used as the estimate, and ideally it coincides precisely with the desired value.

Figure 6:
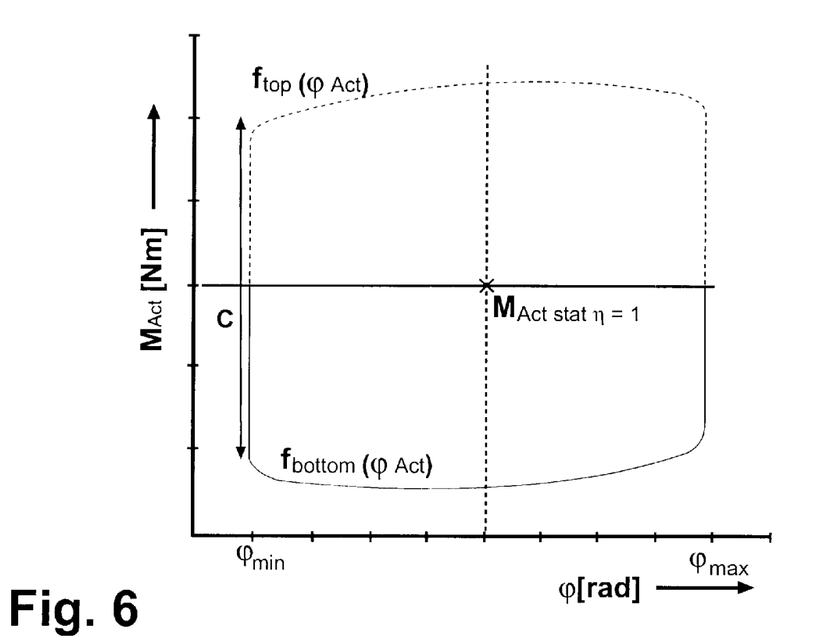

In the method shown in FIG. 6, the ordinates of the straight line dividing the area horizontally are used to calculate the estimate for $M_{Act,stat,\_\eta=1}$. For this purpose, the curve trace is divided into an upper and a lower limit. The functions $F_{top(\phi_{Act})}$ or $F_{bottom(\phi_{Act})}$ that are represented by these lines are integrated, resulting in the areas $F_{top}$ and $F_{bottom}$. $M_{Act,stat,\_\eta=1}$ is thus derived as follows:

$$M_{Act,stat,\eta=1,estimate} = \frac{1}{2} \cdot \frac{F_{top} + F_{bottom}}{\phi_{max} - \phi_{min}}$$

Figure 7:
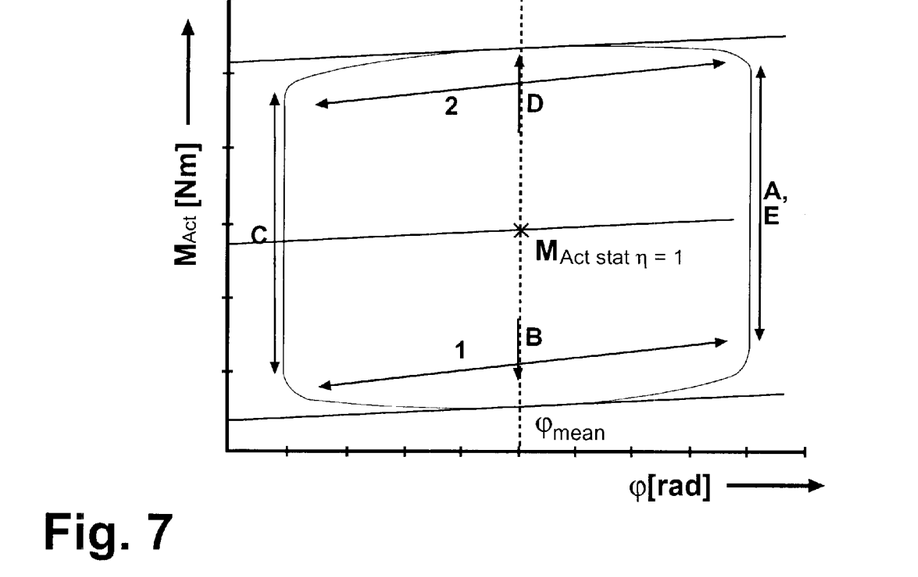

In the method shown in FIG. 7, regions 1 and 2 or the curve trace are approximated by straight lines. For this purpose, the slope and axis segment are chosen in such a way that the sum of the mathematical squares of the error values is minimized. It is obvious that it would not be expedient to include the vertical regions A and C in this approximation. Consequently, the straight line may only be adapted to measured values that lie in a region in the middle of the curve trace.

A mean straight line is formed from the two straight lines, which ideally runs through point ($\phi_{Act,mean}$, $M_{Act,stat,\eta=1}$) The equation for the estimate is as follows:

$$M_{Act,stat,\eta=1,estimate} = \frac{y_{top} + y_{bottom}}{2} + \frac{m_{top} + m_{bottom}}{2} \cdot \phi_{Act,mean}$$

with $\gamma_{top}$ and $\gamma_{bottom}$ designating the axis segments and $m_{top}$ and $m_{bottom}$ designating the slopes of that straight line respectively.

Figure 8:
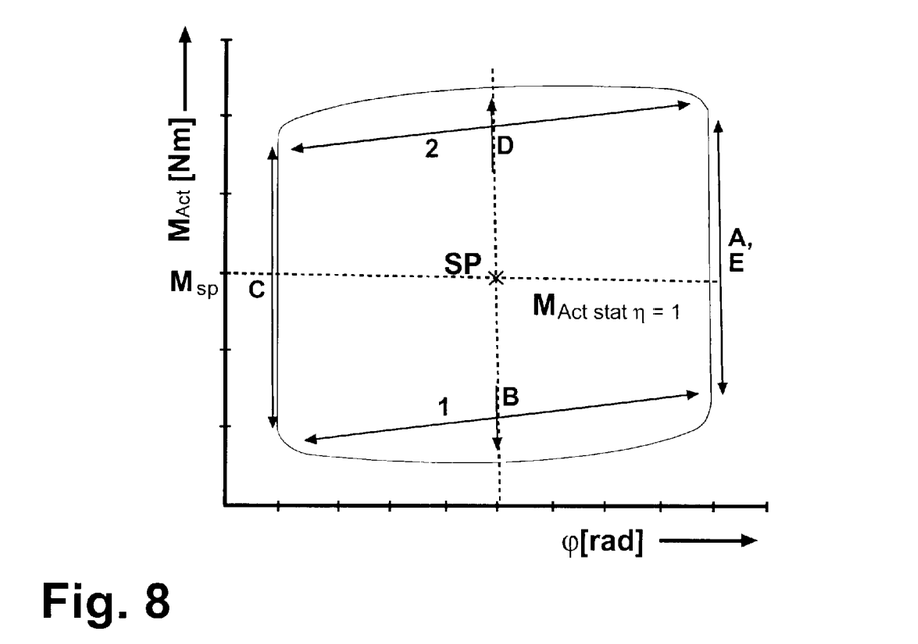

FIG. 4 demonstrates that the point with the coordinates ($\phi_{Act,mean}$, $M_{Act,stat,\eta=1}$) ideally coincides with the center of gravity of the area. Therefore, the method represented in FIG. 8 uses the ordinates of the center of gravity as the estimate for $M_{Act,stat,\eta=1}$.

The curve trace according to FIG. 6 is divided into an upper and a lower curve to calculate the center of gravity. The calculation of the center of gravity is then carried out by means of integration according to the following equations:

For the upper curve trace:

$$y_{s,top} = \frac{\int_{\phi_{Act,min}}^{\phi_{Act,max}} [f_{top}(\phi_{Act})]^2 d\phi_{Act}}{2 \cdot F_{top}}$$

$$F_{top} = \int_{\phi_{Act,max}}^{\phi_{Act,min}} f_{top}(\phi_{Act}) d\phi_{Act}$$

For the lower curve trace:

$$y_{s,bottom} = \frac{\int_{\phi_{Act,min}}^{\phi_{Act,max}} [f_{bottom}(\phi_{Act})]^2 d\phi_{Act}}{2 \cdot F_{bottom}}$$

$$F_{bottom} = \int_{\phi_{Act,max}}^{\phi_{Act,min}} f_{bottom}(\phi_{Act}) d\phi_{Act}$$

Therefore, the following equation can be established for the actuator torque value that is to be estimated $M_{Act,stat,\eta=1,estimate}$:

$$M_{Act,stat,\eta=1,estimate} = y_s = \frac{y_{s,top} \cdot F_{top} + y_{s,bottom} \cdot F_{bottom}}{F_{top} - F_{bottom}}$$

As already mentioned above, the estimated actuator torque value $M_{Act,stat,\eta=1}$, estimate is not available continuously; in fact, it is determined only once while the area is being evaluated. However, a control system for generating defined actuating forces needs continuous feedback.

In connection with FIGS. 9 to 14, an explanation shall be provided describing how, according to the present invention, the estimated actuator torque value $M_{Act,stat,\eta=1}$, estimate is used to adapt a model of the brake or the wheel dynamics so that a continuous feedback variable can be provided by the model.

Figure 9:
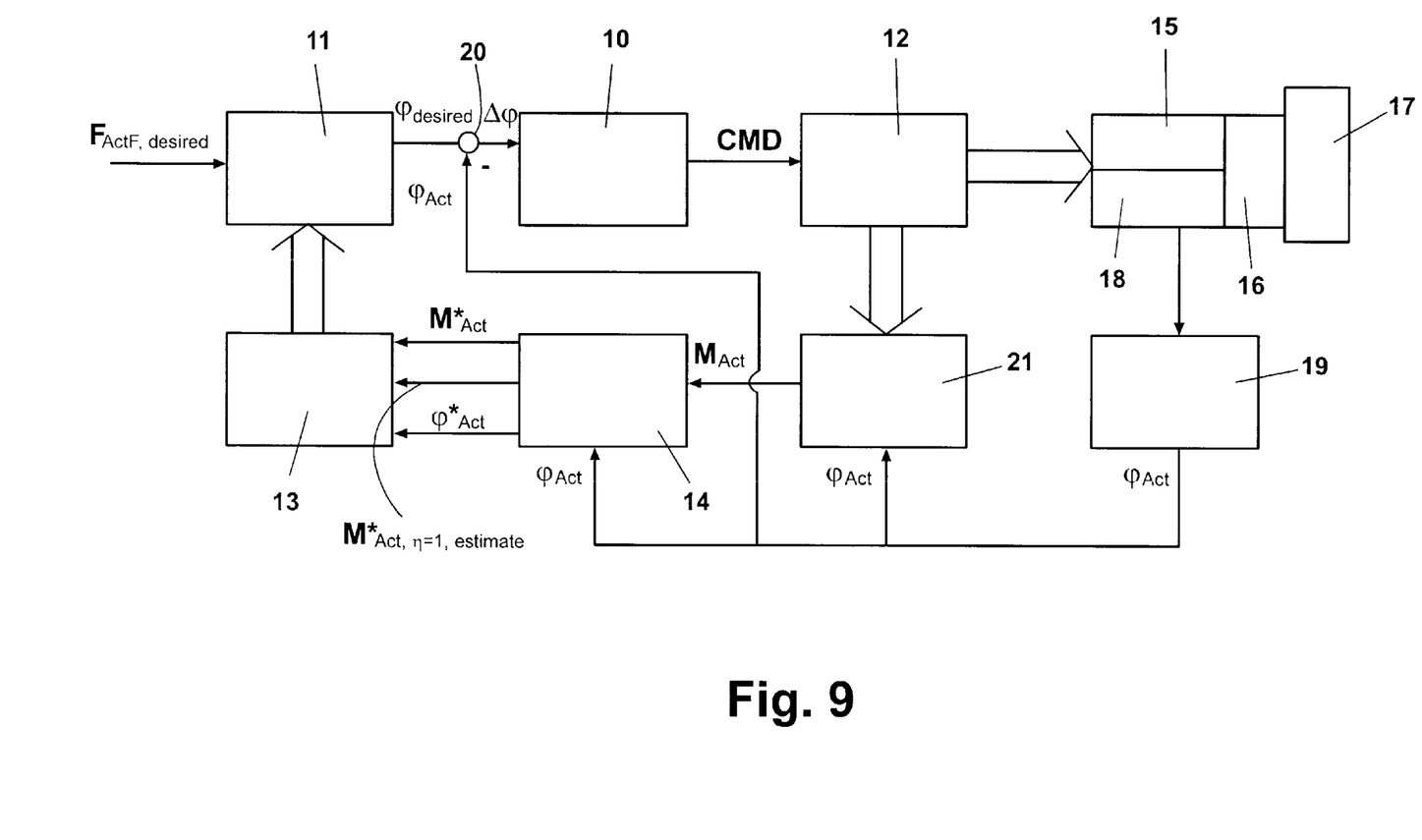
FIGS. 9 to 14 Five embodiments of the control circuits that can be used to execute the process according to the present invention.

The control circuit according to the present invention for generating defined actuating forces shown in FIG. 9 basically consists of a position control device 10, a desired position value generator 11 connected upstream of the position control device 10, an electronic energy unit 12 connected downstream of the position control device 10, a brake model adaptation module 13 as well as an estimating module 14. The electronic energy unit 12, to which the output signal CMD (command=controlled variable) of the position control device 10 is supplied as the input signal, generates electric output variables (e.g. an actuator voltage $U_{Act}$ and/or an actuator current $I_{Act}$) which are used to drive an actuator 15 (shown only schematically) that actuates an electromechanically actuatable brake 17 via a gear 16. The actuator 15, which preferably consists of an electric motor, preferably should be equipped with an angular position measuring system 18, whose signal which corresponds to the actual actuator position preferably is supplied to a position signal conditioning circuit 19, whose output signal $\phi_{Act}$ is provided to a summing point 20, an actuator torque calculating module 21 as well as the above-mentioned estimating module 14. In the summing point 20 a control deviation $\Delta\phi_{Act}$ is formed from the signal $\phi_{desired}$ representing the desired actuator position and the signal $\phi_{Act}$ mentioned before. This control deviation $\Delta\phi_{Act}$ is used as the input variable for the position control device 10. The signal $\phi_{desired}$ is generated by the desired position value generator 11, which includes a brake model and to which a signal $F_{ActF,desired}$ corresponding to the desired actuating force is supplied. Adapted model variables are provided to the brake model, which are generated in the brake model adaptation module 13 from the output signals $M^*_{Act,\eta=1,estimate}$ and $\phi^*_{Act}$ and/or $M^*_{Act}$ of the estimating module 14, to which the actuator torque $M_{Act}$ calculated by the actuator torque calculating module 21 is supplied as the input variable. The actuator torque is calculated with the actuator input variables provided by the electronic energy unit 12 and, if applicable, the signal $\phi_{Act}$ representing the actual actuator position.

Figure 10:
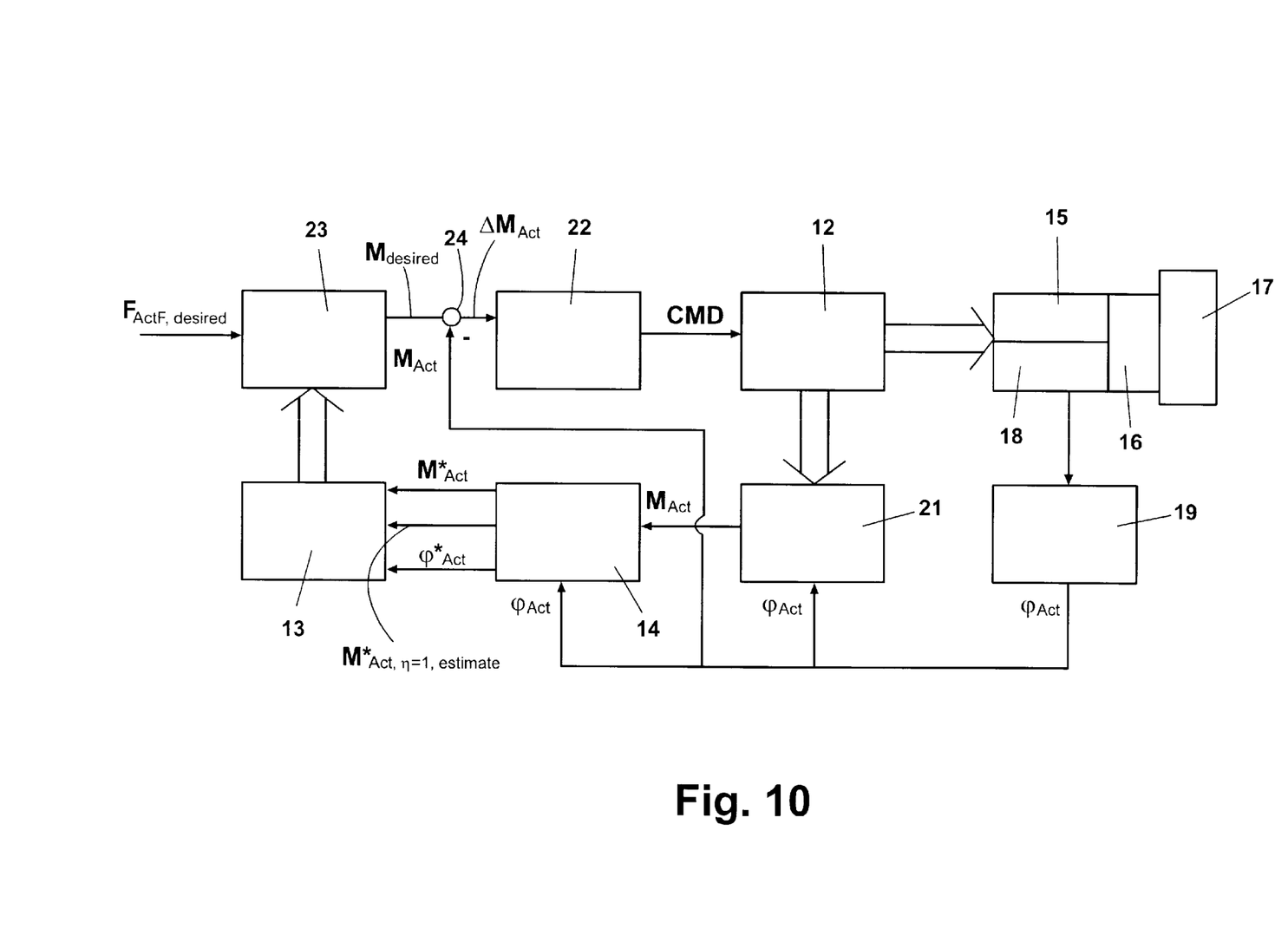

In the control circuit shown in FIG. 10, the parts mentioned already in connection with FIG. 9 have been marked with the same reference numbers. The difference to FIG. 9 is that a desired torque value generator 23 is connected upstream of a torque control device 22. The desired torque value generator 23, which contains the brake model and to which the above-mentioned desired actuating force signal $F_{ActF,desired}$ is supplied as the input signal, generates a signal representing the desired actuator torque $M_{desired}$, based on which a control deviation $\Delta M_{Act}$ is formed by subtracting the signal representing the above-mentioned actual actuator torque $M_{Act}$ from $M_{desired}$ in a second summing point 24 and supplied to the torque control device 22. The actual actuator torque signal $M_{Act}$ is again supplied by the actuator torque calculating module 21. In all other respects both the signal generation and signal processing basically correspond to the processes described in connection with FIG. 9.

Figure 11:
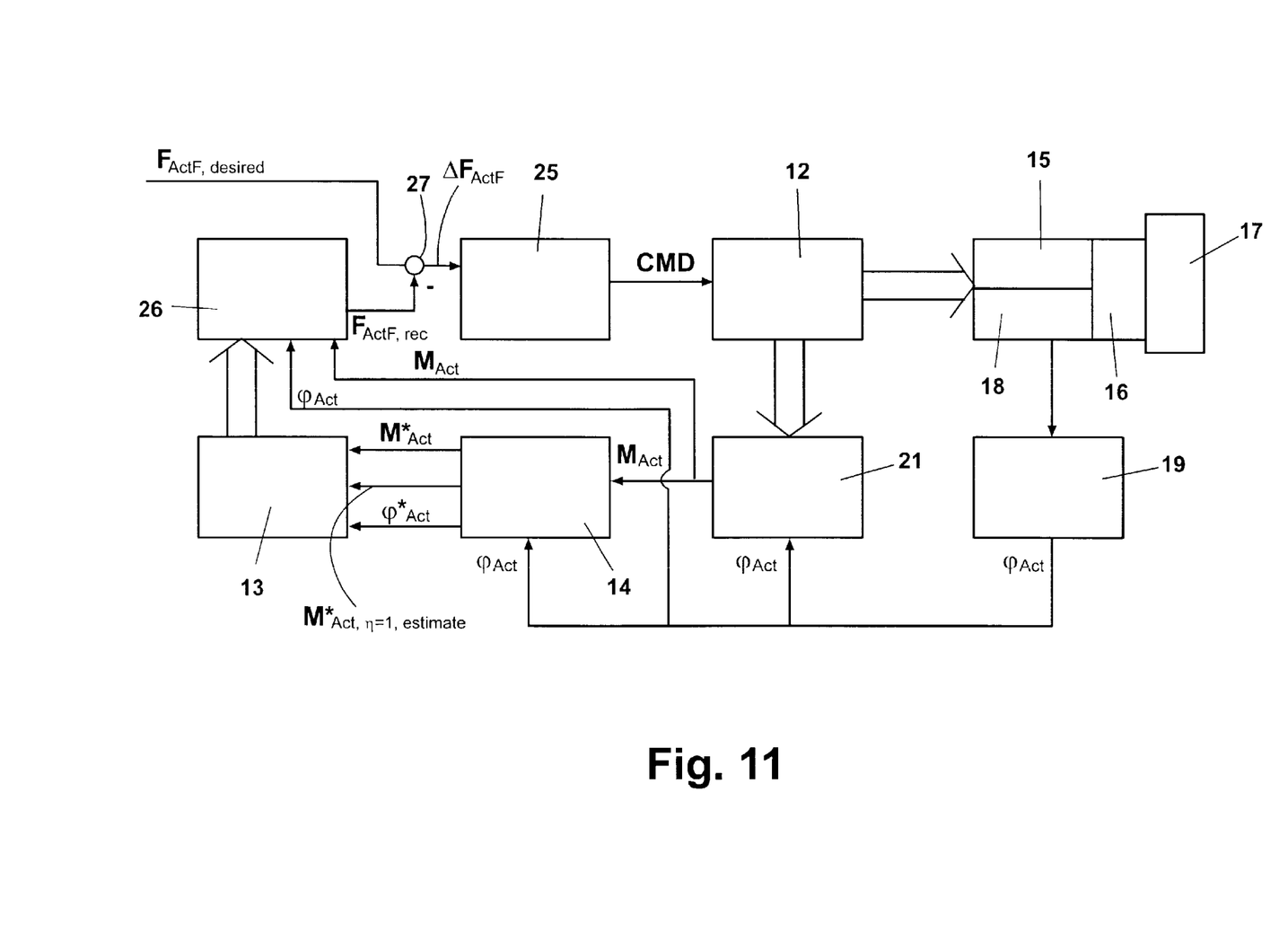

The third control circuit, shown in FIG. 11, exhibits an actuating force control 25, to which a control deviation $\Delta F_{ActF}$ is supplied as the input variable, with the control deviation $\Delta F_{ActF}$ being formed in a third summing point 27 by subtracting a signal $F_{ActF,rec}$ representing a reconstructed actuating force from the desired actuating force signal $F_{ActF,desired}$ already mentioned above. The signal $F_{ActF,rec}$ corresponding to the reconstructed actuating force is preferably provided by an actuating force reconstruction module 26, which contains the brake model and to which the actual actuator position signal $\phi_{Act}$ and/or the actuator torque value $M_{Act}$ caclulated in the actuator torque calculating module 21 are supplied as input variables.

In the embodiments of the control circuit according to the present invention shown in FIGS. 9 to 11, it can prove advantageous if the brake model adaptation module 13 calculates the model variables by means of parameter estimates. For this purpose, the brake model preferably can represent either the rigidity of the brake 17 or its efficiency.

Figure 12:
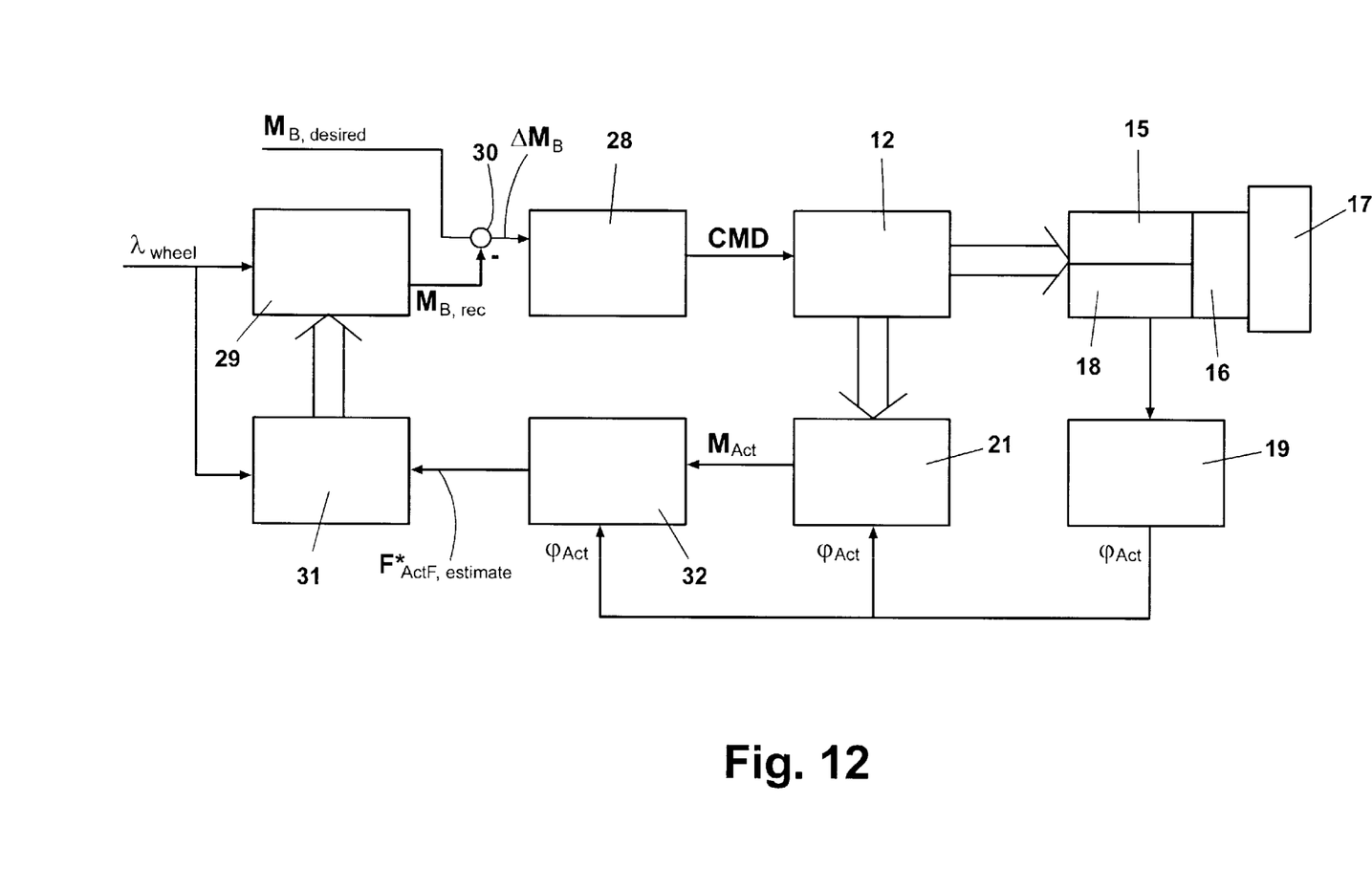

The fourth variant of the control circuit shown in FIG. 12 exhibits a braking torque control 28, to which a control deviation $\Delta M_B$ is supplied as the input variable, with this being formed in a fourth summing point 30 by subtracting a signal $M_{B,rec}$ representing a reconstructed braking torque from a desired braking torque signal $M_{B,desired}$. In this connection, the signal $M_{B,rec}$ corresponding to the reconstructed braking torque preferably is provided by a braking torque reconstruction module 29, which contains a relationship between the slip $\lambda_{wheel}$ occurring at the wheel and the appropriate braking torque and to which the signal $\lambda_{wheel}$ corresponding to the wheel slip as well as adapted characteristic values are supplied as input variables. For this purpose, the adapted characteristic values preferably are generated in a characteristic curve adaptation module 31, to which the wheel slip signal $\lambda_{wheel}$ as well as an estimated actuating force value $F^*_{ActF,estimate}$ are supplied, with the latter being provided by an estimating module 32 that is modified in comparison to those described in the embodiments shown in FIGS. 9 to 11.

Figure 13:
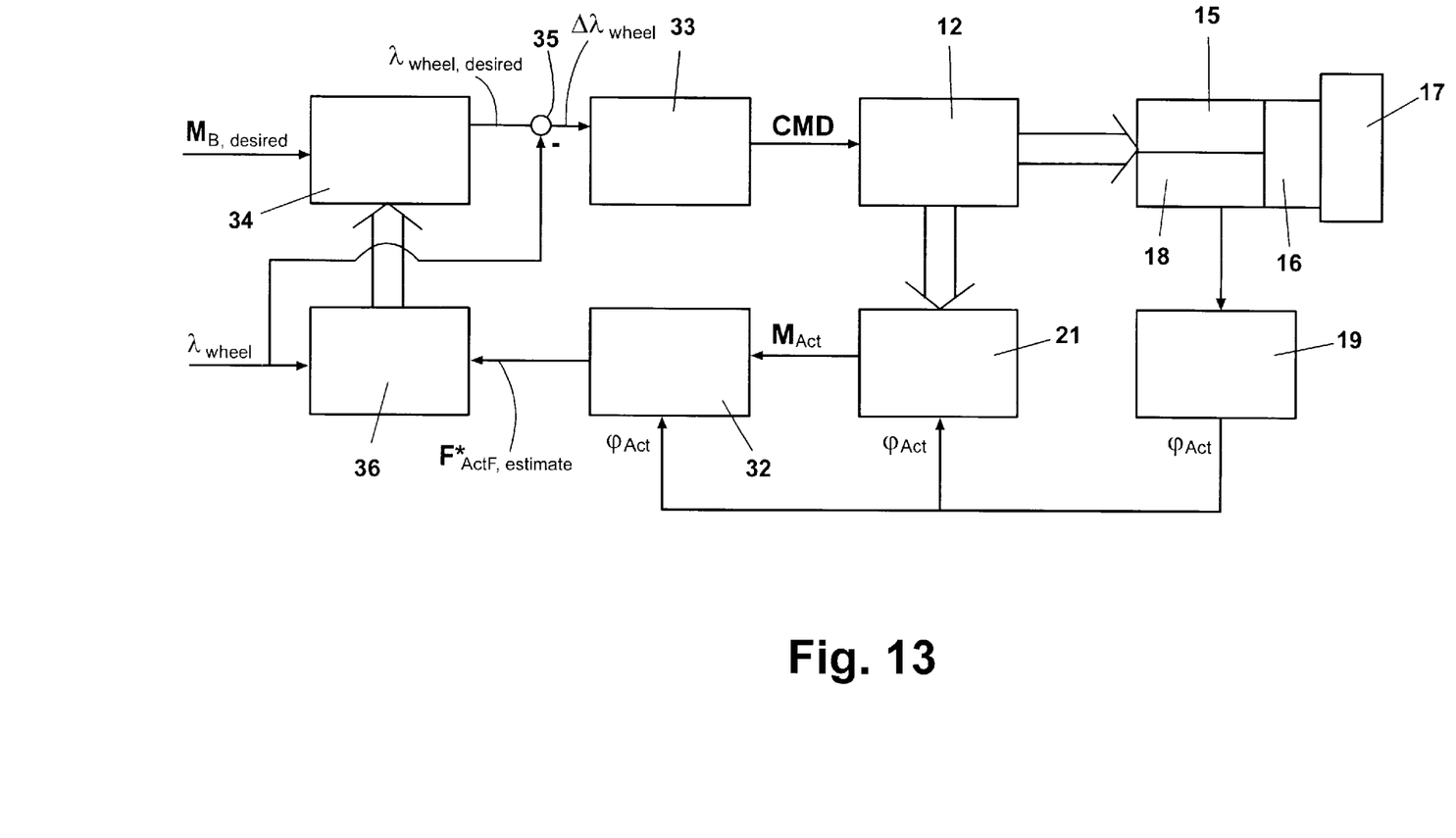

The fifth control circuit according to FIG. 13 is characterized in that a slip control 33 is provided, to which a control deviation $\Delta\lambda_{wheel}$ is supplied as the input variable, with such control deviation $\Delta\lambda_{wheel}$ being obtained by subtracting the wheel slip signal $\lambda_{wheel}$ mentioned in connection with FIG. 12 from a desired wheel slip signal $\lambda_{wheel,desired}$ in a fifth summing point 35. The signal $\lambda_{wheel,desired}$ corresponding to the desired wheel slip preferably should be provided by a desired wheel slip value generator 34 connected upstream of the slip control 33, with such generator 34 containing a relationship between the slip $\lambda_{wheel}$ occurring at the wheel and the appropriate braking torque or a characteristic curve representing this relationship. The desired braking torque signal $M_{B,desired}$ mentioned in connection with FIG. 12 as well as adapted characteristic curves are supplied as input variables to the desired wheel slip generator 34. Similar to the embodiment shown in FIG. 12, the adapted characteristic values are generated in a characteristic curve adaptation module 31, to which the wheel slip signal $\lambda_{wheel}$ as well as the above-mentioned estimated actuating force value $F^*_{ActF,estimate}$ are supplied.

In the embodiments of the control circuit according to the present invention shown in FIGS. 12 and 13, it can be particularly advantageous if the characteristic curve adaptation module 31 or 36 adapts the characteristic curve by means of parameter estimates.

Figure 14:
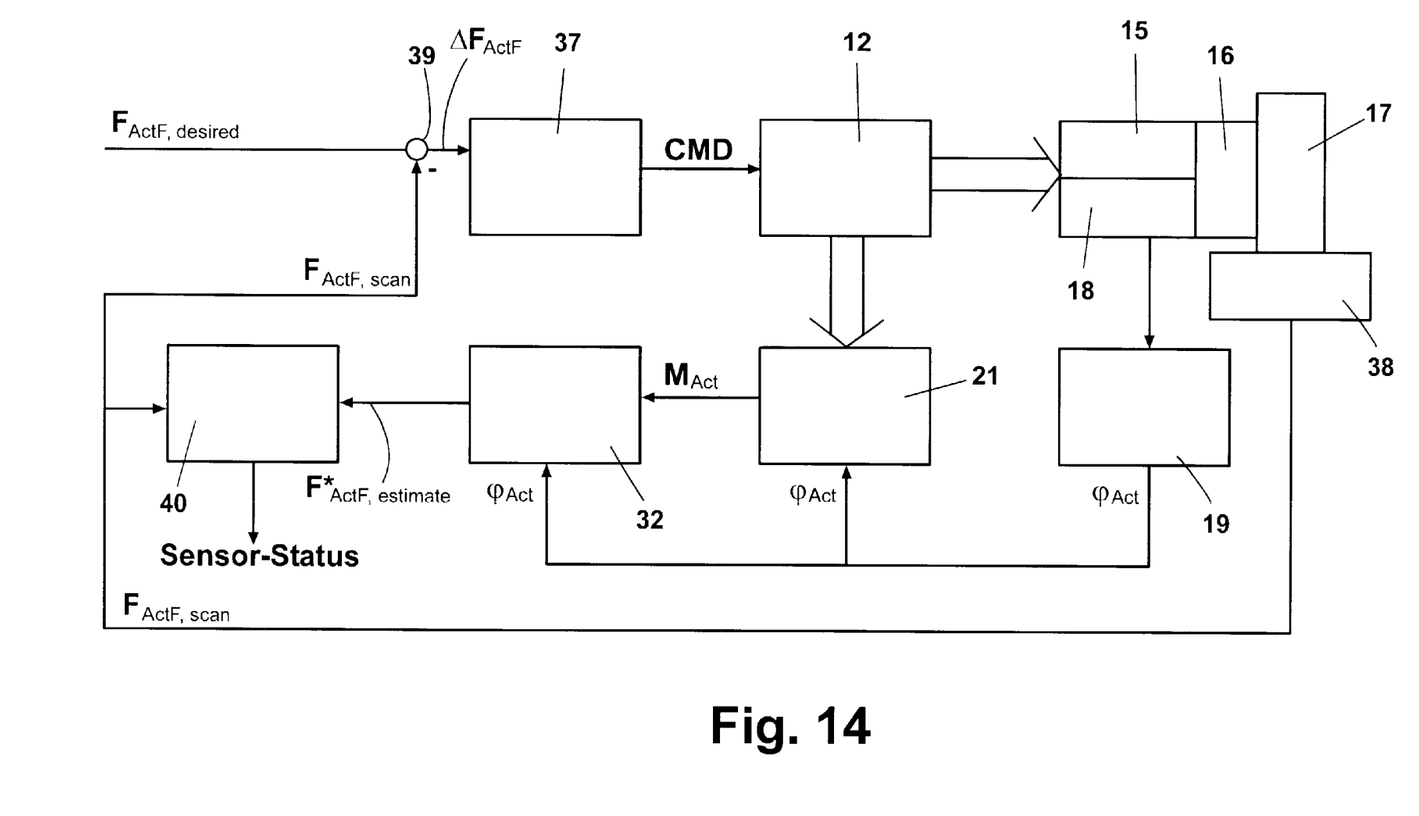

Finally, the sixth control circuit shown in FIG. 14 exhibits an actuating force control 37, to which, similar to the embodiment shown in FIG. 11, the control deviation $\Delta F_{ActF}$ is supplied as the input variable, with it being obtained by subtracting an actuating force $F_{ActF,sens}$ picked up at the brake 17 by means of an actuating force sensor 38 from the above-mentioned desired actuating force signal $F_{ActF,desired}$ in a sixth summing point 39. The signal $F_{ActF,sens}$ corresponding to the picked-up actuating force is also supplied to a monitoring module of the actuating force sensor 40, to which the estimated actuating force value mentioned above in connection with FIGS. 12 and 13 is supplied as the second input variable and which monitors the actuating force sensor 38.

What is claimed is:

1. A process for generating defined actuating forces for a brake that is actuated electrically by means of an actuator, comprising the steps of:
   defining a first relationship between the actuator position and an actuator torque when the brake is applied,
   defining a second relationship between the actuator position and the actuator torque when the brake is released,
   evaluating the actuator torques resulting from the first and second relationships in order to determine an actuator torque value that must be applied to achieve an efficiency of $\eta=1$.

2. A process according to claim 1, further including the steps of determining an area corresponding to the actuator position range and delimited by the two relationships.

3. A process according to claim 2, further including the step of evaluating the area in such a way that the actuator torque value is calculated by working out the mean of the maximum and minimum actuator torque.

4. A process according to claim 3 wherein the area is evaluated in such a way that the center of gravity of the area is calculated and its ordinates are used as estimating values for the actuator torque value.

5. A process according to claim 2, further including the step of evaluating the area such that the actuator torque value is determined by calculating the ordinates of the horizontal straight lines cutting the area in half.

6. A process according to claim 2, further including the step of evaluating the area such that the mean values of the actuator torques from both relationships are derived at the same actuator position respectively and that a compensating straight line is established by means of the ensuing mean values, whose ordinates are used as an estimate for the actuator torque value.

7. A process according to claim 2, further including the step of evaluating the area such that the center of gravity of the area is calculated and its ordinates are used as an estimate of the actuator torque value.

8. A process according to claim 1, further including the step of controlling the brake in such a way that an actuator torque-actuator position area is passed through.

9. A process according to claim 8, further including using a sinusoidal or cosine-shaped control signal superimposed over the actuating signal.

10. A process according to claim 1, further including the step of deriving the actuator torque from at least one of the following:
   the actuator current,
   the actuator current and the actuator voltage,
   the actuator current and the actuator position,
   the actuator voltage and the actuator position,
   the actuator current, the actuator voltage and the actuator position.

11. A process according to claim 10 further including the steps of determining an estimated value of the actuating force from the actuator torque value through a gear ratio.

12. A process according to claim 1, further including. the step of evaluating the actuator torques at the same actuator positions ($\phi_{Act}$).

13. A process according to claim 1, wherein the actuator torques are corrected to take into consideration the inertia torque of the brake prior to determining the efficiency.

14. A control circuit for generating defined actuating forces for a brake that is actuated electrically by means of an actuator and a gear, wherein a first relationship exists between the actuator position and the actuator torque when the brake is applied and wherein a second relationship exists between the actuator position and the actuator torque when the brake is released, comprising:
   a) a position control device is provided, to which the control difference between a signal representing the desired actuator position and a signal representing the actual actuator position is supplied as the input signal and whose output signal is used to drive the actuator by way of an electronic energy unit;
   b) a brake model adaptation module is provided, to which the actuator torque value corresponding to the efficiency η=1, the signals representing the appropriate actuator torques from one or both relationships or the appropriate actuator position are supplied for the adaptation and which generates model variables for a brake model;
   c) a desired position value generator is connected upstream of the position control device, which contains the brake model and to which a signal corresponding to the desired actuating force as well as the adapted model variables are supplied and which generates the desired position signal for the actuator on the basis of the brake model;
   d) an estimating module is provided, to which the signals corresponding to the actuator torque or the actuator position are supplied and which generates the signals representing the actuator torque value corresponding to efficiency=1, the appropriate actuator torques from one or both relationships or the appropriate actuator position.

15. An electromechanically actuatable brake according to claim 14, wherein the brake model represents the rigidity of the brake.

16. A control circuit for generating defined actuating forces for a brake that is actuated electrically by means of an actuator and a gear, wherein a first relationship exists between the actuator position and the actuator torque when the brake is applied and a second relationship exists between the actuator position and the actuator torque when the brake is released, comprising:
   a) a torque control device is provided, to which the control difference between a signal representing the desired actuator torque and a signal representing the actual actuator torque is supplied as the input signal and whose output signal is used to drive the actuator via an electronic energy unit;
   b) a brake model adaptation module is provided, to which the actuator torque value corresponding to the efficiency η=1, the signals representing the appropriate actuator torques from one or both relationships or the appropriate actuator position are supplied for the adaptation and which generates model variables for a brake model;
   c) a desired torque value generator is connected upstream of the torque control device, which contains the brake model and to which a signal corresponding to the desired actuating force as well as the adapted model variables are supplied and which generates the desired torque signal for the actuator on the basis of the brake model;
   d) an estimating module is provided, to which the signals corresponding to the actuator torque or the actuator position are supplied and which generates the signals representing the actuator torque value corresponding to efficiency η=1, the appropriate actuator torques from one or both relationships and/or the appropriate actuator position.

17. An electromechanically actuatable brake according to claim 16, wherein the brake model represents the efficiency of the brake.

18. A control circuit for generating defined actuating forces for a brake that is actuated electrically by means of an actuator and a gear, wherein a first relationship exists between the actuator position and the actuator torque when the brake is applied and a second relationship exists between the actuator position and the actuator torque when the brake is released, comprising:
   a) an actuating force control device is provided, to which the control difference between a signal representing the desired actuating force and a signal representing the reconstructed actual actuating force value is supplied as the input signal and whose output signal is used to drive the actuator via an electronic energy unit;
   b) a brake model adaptation module is provided, to which the actuator torque value corresponding to the efficiency η=1, the signals representing the appropriate actuator torques from one or both relationships or the appropriate actuator position are supplied for the adaptation and which generates model variables for a brake model;
   c) an actuating force reconstruction module is connected upstream of the actuating force control device, which contains the brake model and to which signals representing the actual actuator torque or the actual actuator position are supplied and which generates the actual actuating force value on the basis of the brake model;

d) an estimating module is provided, to which the signals corresponding to the actuator torque or the actuator position are supplied and which generates the signals representing the actuator torque value corresponding to efficiency η=1, the appropriate actuator torques from one or both relationships or the appropriate actuator position.

19. A control circuit for generating defined actuating forces for a wheel brake for motor vehicles that is actuated electrically by means of an actuator and a gear, wherein a first relationship exists between the actuator position and the actuator torque when the brake is applied and a second relationship exists between the actuator position and the actuator torque when the brake is released, comprising:

a) a slip control device, to which the control difference between a signal representing the desired wheel slip value and a signal representing the actual wheel sleep value is supplied as the input signal and whose output signal is used to drive the actuator via an electronic energy unit;

b) a characteristic curve adaptation module is provided, to which the estimated actuating force value and the signal corresponding to the wheel slip are supplied for the adaptation and which generates parameters defining a relationship between the wheel slip and the braking torque;

c) a desired wheel slip value generator is connected upstream of the slip control, which contains the relationship and to which a signal corresponding to the desired braking torque as well as the adapted parameters are supplied and which generates the desired wheel slip signal;

d) an estimating module is provided, to which the signals corresponding to the actuator torque and the actuator position are supplied and which generates the estimated actuating force value.

20. A control circuit for generating defined actuating forces for a wheel brake for motor vehicles that is actuated electrically by means of an actuator and a gear, wherein a first relationship exists between the actuator position and the actuator torque when the brake is applied and a second relationship exists between the actuator position and the actuator torque when the brake is released, comprising:

a) a braking torque control is provided, to which the control difference between a signal representing the desired braking torque value and a signal representing the reconstructed actual braking torque value is supplied as the input signal and whose output signal is used to drive the actuator via an electronic energy unit;

b) a characteristic curve adaptation module is provided, to which the estimated actuating force value and the signal corresponding to the wheel slip are supplied for the adaptation and which generates parameters defining a relationship between the wheel slip and the braking torque;

c) a braking torque reconstruction module is connected upstream of the braking torque control, which contains the relationship and to which a signal corresponding to the wheel slip as well as the adapted parameters are supplied and which generates the reconstructed actual braking torque;

d) an estimating module is provided, to which the signals corresponding to the actuator torque and the actuator position are supplied and which generates the estimated actuating force value.

21. A control circuit for generating defined actuating forces for a wheel brake for motor vehicles that is actuated electrically by means of an actuator and a gear, wherein a first relationship exists between the actuator position and the actuator torque when the brake is applied and a second relationship exists between the actuator position and the actuator torque when the brake is released, comprising:

a) an actuating force control device is provided, to which the control difference between a signal representing the desired actuating force value and a signal representing the scanned actual actuating force value is supplied as the input signal and whose output signal is used to drive the actuator via an electronic energy unit;

b) an actuating force sensor is provided, whose output signal is the scanned actual actuating force value;

c) a monitoring module for the actuating force sensor is provided, which monitors the actuating force sensor by means of the estimated actuating force value.

* * * * *

UNITED STATES PATENT AND TRADEMARK OFFICE
CERTIFICATE OF CORRECTION

PATENT NO.    : 6,435,625 B1
DATED         : August 20, 2002
INVENTOR(S)   : Ralf Schwarz et al.

It is certified that error appears in the above-identified patent and that said Letters Patent is hereby corrected as shown below:

Column 13,
Line 28, change "further including. the" to -- further including the --.

Signed and Sealed this

Eighteenth Day of February, 2003

JAMES E. ROGAN
*Director of the United States Patent and Trademark Office*